(12) United States Patent
Paulides et al.

(10) Patent No.: US 11,241,954 B2
(45) Date of Patent: Feb. 8, 2022

(54) ELECTRICALLY DRIVEN SINGLE-AXLE TRACTOR

(71) Applicant: Matador Exploitatie B.V., Helvoirt (NL)

(72) Inventors: Johannes Jacobus Hubertus Paulides, Waalwijk (NL); Martijn Johan Wouter Pennings, Eindhoven (NL)

(73) Assignee: MATADOR EXPLOITATIE B.V., Helvoirt (NL)

( * ) Notice: Subject to any disclaimer, the term of this patent is extended or adjusted under 35 U.S.C. 154(b) by 251 days.

(21) Appl. No.: 16/311,975

(22) PCT Filed: Jun. 20, 2017

(86) PCT No.: PCT/NL2017/050412
§ 371 (c)(1),
(2) Date: Dec. 20, 2018

(87) PCT Pub. No.: WO2017/222374
PCT Pub. Date: Dec. 28, 2017

(65) Prior Publication Data
US 2019/0202287 A1    Jul. 4, 2019

(30) Foreign Application Priority Data

Jun. 20, 2016   (NL) .................................. 2017010

(51) Int. Cl.
*B60K 1/00*   (2006.01)
*B60K 17/28*  (2006.01)
(Continued)

(52) U.S. Cl.
CPC ................ *B60K 17/28* (2013.01); *B60K 1/00* (2013.01); *B60K 1/04* (2013.01); *B60K 16/00* (2013.01);
(Continued)

(58) Field of Classification Search
CPC . B60K 17/28; B60K 1/00; B60K 1/02; B60K 1/04; B60K 2001/001;
(Continued)

(56) References Cited

U.S. PATENT DOCUMENTS 3,732,671 A * 5/1973 Allen ..................... A01D 69/02
56/10.2 R
3,832,834 A * 9/1974 Kovacs .................. A01D 75/30
56/6
(Continued)

FOREIGN PATENT DOCUMENTS

EP    1452084 A2   9/2004
EP    2732687 A1   5/2014
(Continued)

OTHER PUBLICATIONS

International Search Report and Written Opinion for corresponding PCT App. No PCT/NL2017/050412 dated Oct. 10, 2017.

*Primary Examiner* — James M Dolak
(74) *Attorney, Agent, or Firm* — Emerson, Thomson & Bennett, LLC; Roger D. Emerson (57) ABSTRACT

The present invention relates to an electrically driven single-axle tractor for coupling with, and powering of, various pieces of equipment, comprising: a frame; a drive axle, connected to the tractor frame, provided with one pair of wheels; a primary electric motor coupled to the drive axle; at least a secondary electric motor coupled to an equipment drive shaft for releasable coupling with a piece of equipment; and, at least one electrical energy source, as power supply of the primary and secondary electric motor. The invention also provides an assembly of such a tractor and a piece of equipment as well as a method for driving such a tractor.

21 Claims, 4 Drawing Sheets

(51) Int. Cl.
*B60K 1/04* (2019.01)
*B60K 16/00* (2020.01)
*B62D 51/06* (2006.01)

(52) U.S. Cl.
CPC ........ *B62D 51/06* (2013.01); *B60K 2001/001* (2013.01); *B60K 2016/003* (2013.01); *B60Y 2200/148* (2013.01); *B60Y 2200/225* (2013.01); *B60Y 2400/114* (2013.01); *B60Y 2400/202* (2013.01); *Y02T 10/90* (2013.01)

(58) Field of Classification Search
CPC .............. B60K 2001/005; B60K 16/00; B60K 2016/003; B60K 25/06; B60K 25/00; B60K 2025/005; B62D 51/06; B62D 51/00; B62D 51/04; B62D 51/008
See application file for complete search history.

(56) References Cited

U.S. PATENT DOCUMENTS

| | | | | |
|---|---|---|---|---|
| 4,987,729 | A | 1/1991 | Paytas | |
| 5,406,778 | A * | 4/1995 | Lamb | A01D 34/44 180/65.1 |
| 6,564,481 | B2 * | 5/2003 | Wakitani | B62D 11/003 37/348 |
| 6,802,175 | B2 * | 10/2004 | Fillman | A01D 34/58 56/11.9 |
| 7,116,065 | B2 * | 10/2006 | Wakitani | B62D 51/04 318/67 |
| 7,143,835 | B2 * | 12/2006 | Fukuzumi | A01B 33/028 172/119 |
| 7,677,017 | B2 * | 3/2010 | Holby | A01D 34/82 56/10.6 |
| 8,191,342 | B2 * | 6/2012 | Ishii | B60K 17/043 56/11.9 |
| 8,887,841 | B2 * | 11/2014 | Oswald | A01D 34/82 180/6.48 |
| 8,931,189 | B2 * | 1/2015 | Jones | E02F 3/46 37/410 |
| 9,288,942 | B2 * | 3/2016 | Moriguchi | A01D 67/00 |
| 9,663,159 | B2 * | 5/2017 | Ertel | B60K 17/28 |
| 9,699,965 | B2 * | 7/2017 | Schygge | A01D 69/02 |
| 9,937,779 | B2 * | 4/2018 | Koike | B60K 7/0007 |
| 10,968,982 | B2 * | 4/2021 | Barendrecht | F16H 37/04 |
| 11,042,152 | B2 * | 6/2021 | Towers | G05D 1/0016 |
| 11,102,928 | B2 * | 8/2021 | Uemura | B60K 1/04 |
| 11,116,130 | B2 * | 9/2021 | Phillip | A01D 34/66 |
| 2004/0007402 | A1 | 10/2004 | Kujawa | |
| 2004/0194982 | A1 | 10/2004 | Fukuzumi | |
| 2006/0288680 | A1 | 12/2006 | Holby | |

FOREIGN PATENT DOCUMENTS

| | | |
|---|---|---|
| GB | 678509 A | 9/1952 |
| JP | 2001-341671 A | 12/2001 |
| JP | 2010-279342 A | 12/2010 |
| JP | 5882443 B1 | 3/2016 |
| JP | 2016-049028 A | 4/2016 |
| WO | 20020098204 A1 | 12/2002 |

* cited by examiner

ELECTRICALLY DRIVEN SINGLE-AXLE TRACTOR

The present invention relates to an electrically driven single-axle tractor arranged for coupling with, and powering of, various pieces of equipment. The invention further relates to an assembly of such electrically driven single-axle tractor by a primary electric motor and a piece of equipment driven by at least a secondary electric motor also located on the tractor, as well as to a method for driving such an electrically driven single-axle tractor.

Single-axle tractors are relatively small tractors that are self-powered and self-propelled which benefit of their compact design, making them useful for agriculture, horticulture, industry, landscaping, farm and home use. They are arranged to push and/or pull or power various agricultural related implements. Existing single-axle tractors commonly use an internal combustion engine and may for example be designed for ground care maintenance and cultivation. Such tractors are usually capable of tilling previously tilled soil or light sanded soil with a relatively stable number of power take-off rotations per minute. However, on hard soil, or rocky grounds, the conventional tractors become less efficient because the force required to till the ground exceeds the force exerted on the ground by the mass of the machine. Consequently this may cause the machine to "walk" over the ground and skip spots, which may result in uneven tilling of the ground or to a shallow tilling depth. Furthermore, to generate traction from an internal combustion engine single-axle tractor, special traction wheels and gear transmission have to be used and frequent and relative complex switching between transmissions is required.

The US patent application 2006/288680 discloses a walk-behind mower including a cutting unit connected to the frame. More specifically the mower is provided with a modular power source which may include electric motors that ere energised by a reciprocating engine or a battery.

The present invention has for its object to provide an improved single-axle tractor that provides enhanced flexibility and efficiency in use than the prior art equipment.

The invention provides for this purpose an electrically driven single-axle tractor for coupling with, and powering of, various pieces of equipment, comprising: a frame; a drive axle, connected to the tractor frame, provided with at least one pair of wheels; a primary electric motor coupled to the drive axle; an equipment drive shaft for releasable coupling with a piece of equipment; and, at least one electrical energy source, as power supply of the primary electric motor; wherein the tractor is further provided with at least one secondary electric motor, which secondary electric motor is coupled to the equipment drive shaft, wherein the at least one electrical energy source is also a power supply of the secondary electric motor, wherein the drive axle and the equipment drive shaft are mutually substantially perpendicular oriented, and wherein the primary electric motor is only connecting to the wheels on the drive axle and the secondary electric motor is only connecting to the equipment drive shaft. The use of the primary and at least a secondary electric motor in the application of a single-axle tractor is advantageous compared to combustion motors as they have a high efficiency, produce less noise and have low maintenance requirements. Furthermore there is no air pollution (no exhaust fumes) that enable both indoor and outdoor use of the tractor. Furthermore, they may be more sustainable as they may be powered with eco-friendly electric power and cause less pollution at their location of operation. Of high relevance is also the application with at least two electric motors; a primary electric motor for driving the tractor and a secondary for driving the equipment drive shaft. This implies that the primary and at least a secondary electric motor may be optimised in their design for their specific (and differing) use; the driving of the drive axle and the drive of the equipment drive shaft. Also the need for a transmission between the primary electric motor for driving the tractor and the equipment drive shaft is vanished. Both the electric drives function independent from each other (so their frequency during use may be regulated independent from each other) also providing better and more control of their individual use. This implies that the efficiency of the driving of the primary and at least secondary electric motor is enhanced compared to single motor driven single-axle tractors. As the mechanical construction of the single-axle tractor according the present invention will be simpler than that of a single drive operated single-axle tractor the tractor according the present invention will also be simpler to be controlled and it require less maintenance than single drive single-axle tractors. A further advantage of the electrical energy source being the power supply for both the first and at least the secondary electric motor is that the available electrical energy in the tractor may be optimally used by the combined electric motors. Yet the drive axle and the equipment drive shaft being mutually substantially perpendicular oriented also contributes to simplicity of the construction and optimising the use of the available energy as an intermediate coupling for the various pieces of equipment is normally not required as the pieces of equipment may normally be driven by an axis that is in line with such equipment drive shaft. A tractor according such specifications may be used for road, work path planning, gardening or any other ground or surface working operation. The tractor may be applied as an autonomous driven tractor or may be controlled via remote control and/or via an operator (e.g. walk behind or sitting on). With a single-axle tractor a tractor is meant that has two wheels on opposite sides of the axle but also plural wheels may be attached to the single-axle (e.g. double wheels on both sides of the axle for heavy terrain use of the tractor).

The drive axle and the equipment drive shaft may be independently controllable, again a technical feature leading to a further increase of control and energy efficiency. Such independent control implies that no gear has to be incorporated between the drive axle and the equipment drive shaft, thus resulting in a relative simple construction and limited friction losses.

The primary electric motor may be embodied as at least one hub electric motor. It is also possible to incorporate two primary electric motors as hub electric motors in each of the wheels. The advantage of the use of one or more primary electric motors located in the wheel(s) is that this enables to further minimise the dimensions of the tractor and to provide a high efficient transmission of the wheel operating power.

The equipment drive shaft may be oriented at a central position of the tractor, normally this results in a positioning of the equipment drive shaft at a location between the wheels. The advantage of such equipment drive shaft location is the central balancing of the weight of the tractor and a simple cooperation with the various pieces of equipment as the drive shafts of the various equipment pieces is normally also oriented at a central location.

The operating range for a tractor according to the invention may between −40° C.-60° C., which makes the tractor applicable during all workable conditions and the secondary electric motor may for example be coupled with the at least one electrical energy source. The use of a second electric motor may also prevent overloading of the primary electric motor. The advantage of providing two separate electric motors on the tractor is that it realises an improved drive performance and may be provide simple simultaneous control of driving the tractor wheels and driving the equipment drive shaft. This also may prevent "running away" of the tractor in difficult soil conditions and provides the ability to vary speed and traction power ratios. This feature enables that the single-axle tractor may be used for cultivating hard soil and removal of snow. Furthermore, the use of electric motors will lead to a limitation of vibrations of the tractor. It is common knowledge that the hand transmitted vibration of a single-axle tractor driven by combustion engine is high and may cause permanent physical damage, for example repetitive strain injury (RSI) or hand-arm vibration syndrome (HAVS). The use of an electric powertrain will result in limited vibrations and may thus prevent injuries emanating from long lasting user exposure on vibrations.

The electrical energy source may for instance be embodied as a supercapacitor, fuel cell and/or a battery, and is preferably a rechargeable electrical energy source. Such electrical power source may be charged from the grid or directly coupled to renewable electrical energy generators, like for example solar panels and/or wind turbines. The tractor may also include an (on-board or external) single or bi-directional AC to DC converter. The electrical energy source may for example include a plurality of individual cells, wherein these cells may be switched individually or in sequence. Examples of batteries are: Lead Acid, Nickel Metal Hydride and Li-Ion batteries. Examples of fuel cells are: a Proton exchange membrane fuel cell, a Phosphoric acid fuel cell, a Solid oxide fuel cell and a Hydrogen-oxygen fuel cell. A further advantage of a rechargeable electrical energy source is that when the single-axle tractor is not in use the electrical energy source may be coupled with the grid or used for off-grid operation to supply and/or equalize power demand variations.

The two-wheel tractor according the present invention may be used as "walk-behind equipment", where the single-axle tractor may comprise a steering rod, which steering rod may comprise handlebars for manual engagement. The handlebars are for example turnable for improved handling of the tractor.

In a further embodiment, the equipment drive shaft may be provided with a coupling for cooperation with a piece of equipment. Such piece of equipment is for example an agricultural implement, and may be selected from a group consisting of cultivators, harrows, snow removers, ploughs, tillers, chippers, sweepers, mowers, transplanters, seeders, spaders, bedformers, ridgers, coverers, mulch layers, scrapers, transporters, trailers and so on. Conventional tractors are typically designed for one single purpose. An advantage of providing an equipment drive shaft which may be coupled to a chosen piece of equipment in combination with the secondary electric motor is that the tractor may be used for multiple purposes. To further simplify the use of the tractor according the present invention custom "pre-sets" operating the electric motors may be provided to carry out specific types of work or processes. Using one tractor with different pieces of equipment will be cheaper and more efficient than using completely different machines. The secondary electric motor is flexible in its use and may meet power demands of varying pieces of equipment. The equipment drive shaft coupling is arranged to provide easy and quick attachment of the piece of equipment. The tractor may also be arranged for both pulling and/or pushing the piece of equipment.

In a possible embodiment the user may also ride the combination of the single-axle tractor and the coupled piece of equipment (thus sit on the tractor and/or the coupled piece of equipment). In a possible embodiment the piece of equipment may therefore be provided with a seat or may even only be suited as a driver seat.

In a further embodiment the primary electric motor may exclusively be connected to the wheels on the drive axle, which could also be replaced by at least two electric motors that each drive the wheel e.g. to allow for the implementation of an electrical differential, and the secondary electric motor is exclusively connecting to the equipment drive shaft. This enables variable speed and independent speed variation of the electric motors. Also an independent power take-off is possible, because of the independent electric motors. The advantage of this primary and at least secondary electric motor configuration is that the tractor may be better controlled, resulting in better performance, especially at difficult terrains like upland fields, hard soils, semi-frozen ground or paddy field.

The tractor according the invention may comprise at least one solar panel and/or alternative charging device e.g. wind turbine. In a possible embodiment at least one rechargeable electrical energy source may possibly be connected to a solar panel, where the solar panel may be used for (re)charging the electrical energy source. The at least one photovoltaic panel may for example be integrated in the frame and/or may for example be connected to the steering rod.

In a yet a further embodiment the tractor may comprise a DC/DC converter. The DC to DC converter may for example be used as a power optimizer to maximize the energy harvested from the solar panel. The electrical energy source may also be used as a power storage (and/or a more general power supply) when coupled to an electric AC or DC network/grid using the DC to DC converter or DC to AC converter.

In a yet a further embodiment the tractor may comprise multiple electric DC or AC electric sockets that allow the tractor to be used to power and/or charge auxiliary devices and/or utilities.

The use of the charging and discharging as energy storage represents a bi-directional flow of energy to and from the electrical tractor. Or in case of, for example, a fuel cell an electrical energy source is present that can be used when the tractor is not operated. Here, meters may record and display the net difference between the electrical power communicated to the grid, and purchased electricity from a power company used at the site of the meter, these meters record the net power difference. A smart control might be added to the tractor to regulate the energy storage use.

In another embodiment the tractor may comprise at least one brake connected to at least one wheel. The presence of a brake provides better controlled turning operation of the tractor and the possibility of a parking brake. This parking brake may be implemented by a separate brake that is placed on the primary electric motor.

The tractor may be provided with a solid axle, whereby the at least one wheel may be connected to the solid axle. In a possible embodiment the tractor may be provided with a differential, instead of such solid axle, which may be mechanical or electrical, to turn the at least one pair of wheels independently of each other, which may result in easier turning. The tractor may also possibly be provided with a differential lock, in order to increase traction and/or assisting the tractor to travel straight. In a possible embodiment the tractor may be provided with a single drive motor attached to at least one of the wheels. In another embodiment, a single motor, possibly aided with a gear and/or an electrical brake and/or an encoder device, is placed in the middle of the tractor and variable slip will be present between the shaft of the electrical motor and the wheels. In a possible embodiment the tractor may be provided with steerable wheels to further minimize the tyre friction.

The tractor may possibly comprise an electronic control unit. The electronic control unit may for example be configured for improving the safety. The electronic control unit may possibly be arranged such that loosening a handlebar instantly stops the tractor.

In a possible embodiment the tractor may be operated in a forward and reverse direction by rotating the steering column. As this may cause cognitive dissonance of the operator the electronic control unit may be configured to automatically convert the accelerator when the steering column is rotated.

In a preferred embodiment the tractor comprises an electrical energy storage management system, for example battery management system. The management system for example monitors the charging and discharging of the electrical energy source. The system may also serve as an interface for the integration of the electrical energy source in an overall electronic system, or connect with the electrical control unit, or to control the connection to the grid. The management system may for example be provided with an alarm and/or a protection system.

The electrical energy source may possibly comprise a housing with a cooling system, to keep the electrical energy source within an acceptable temperature range in order to ensure power output and an improved lifetime.

The single-axle tractor may select the working (controlling) of the system dependent on information provided to the tractor and thus automatically adapt to environmental and/or situational conditions. The tractor may also present information (e.g. as an app or via another display) like for instance the electrical energy source status or maintenance suggestions. The tractor may also provide a third electrical motor, or any further number i.e. to allow PTO's at both sides of the tractor, that may provide an electrical differential, and/or brakes to allow for a turn; possible aided with a PTO motor; a limit detecting module mounted on said housing for detecting a location relationship between said single-axle tractor and said limit, an energy module, e.g. a single or plural batteries, mounted on the single-axle tractor for providing energy for said autonomous vehicle.

The tractor may be provided with a limit detecting module that may comprise sensor at the front, the rear and/or the border of the tractor to determine position or relative positioning to the environment.

This allows for instance the tractor to move autonomous and may also assist in preventing unwanted contact with other objects. The tractor may also use GPS-positioning or other orientation techniques like for instance border indicating elements (like wiring). Autonomous controlled operating of the tractor according the present invention may not only limit the required operator time also increase the efficiency, save energy, protect the environment, improve the service life of the electrical energy source, and provide more service with a specific quantity of electrical energy.

The tractor may be provided with a driving module, that optionally may be mounted on the housing.

The invention also relates to an assembly of an electrically driven single-axle tractor according the invention and a piece of equipment selecting from a group consisting of cultivators, harrows, snow removers, ploughs, tillers, chippers, sweepers, mowers, transplanters, seeders, spaders, bedformers, ridgers, coverers, mulch layers, scrapers, transporters, trailers and/or a combination of such functionalities. The pieces of equipment may be designed to be used with an electric drive and may also be provided with an electric power take off to drive electric equipment on board of the piece of equipment.

The assembly according the present invention also includes a combination of at least two electrically driven tractors as specified above that are coupled to a single piece of equipment. In case of heavy pieces of equipment and/or heavy conditions of use of a piece of equipment also two or more electrically driven tractors may be coupled to a single piece of equipment to provide the required drive capacity. This also enhance the flexibility in operating various types of pieces of equipment with a number of electrically driven tractors. As may be clear also other combinations of plural electrical driven tractors and pieces of equipment are possible.

The invention also provides a method for driving a remote control and/or autonomous single-axle tractor according the invention, wherein the drive axle is powered with a primary electric motor, and/or a plurality of electric motors that drive each tractor wheel, and the equipment drive shaft is driven by a secondary electric motor and the operating of the primary electric motor, and/or a plurality of electric motors that drive each tractor wheel, and the secondary electric motor are independently controlled. The driving of the tractor directly enables to control the power output of all electric motors and does not require the specific skills that are required to operate a prior art combustion engine driven single-axle tractor which is normally provided with a plurality of complex controls. The controls of the present dual electric driven single-axle tractor are limited and easy to operate.

The driving of the tractor may be wireless controlled, and so enables the tractor to function as an automatic tractor. The single-axle tractor may also be robotized. The tractor may for example comprise a GPS-system and/or at least one sensor, which sensor may for example be used for detecting soil conditions or other environmental conditions that have influence on the operation of the tractor. Even further system integration may be realised by connecting the tractor according the present invention with an external database.

The present invention will be further elucidated on the basis of the non-limitative exemplary embodiments shown in the following figures. Herein shows.

Figure 1:
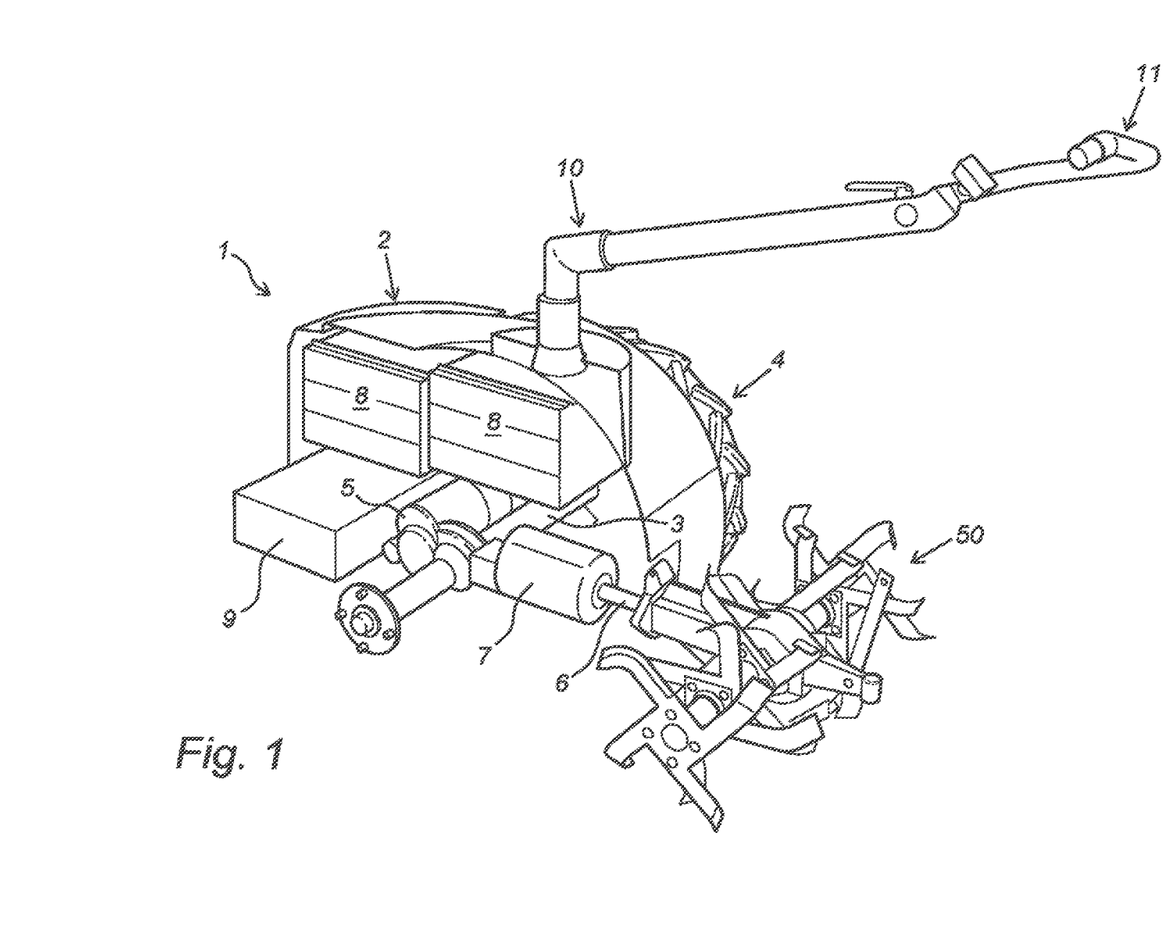
FIG. 1 a schematic representation of a cross-section of an assembly of an electrically driven tractor according to the invention and a piece of equipment, here a plough.

FIG. 1 shows a single-axle tractor (1) for coupling with, and powering of, various pieces of equipment (50), here a plough (50). The tractor (1) is provided with a frame (2), a drive axle (3), connected to the tractor frame (2) that also has two wheels (4). A primary electric motor (5) is coupled to the drive axle (3). Furthermore are shown an equipment drive shaft (6) for releasable coupling with the piece of equipment (50) and two batteries (8) functioning as the power supply of the primary electric motor (5). The equipment drive shaft (6) is oriented perpendicular to the drive axle (3) enabling a simple coupling with the piece of equipment (50). The tractor (1) also has a secondary electric motor (7), which secondary electric motor (7) is coupled to the equipment drive shaft (6). The equipment drive shaft (6) is provided with coupling means (not shown) for cooperation with the piece of equipment (50). The primary electric motor (5) is exclusively connecting to the wheels (4) on the drive axle (3), and the secondary electric motor (7) is exclusively connecting to the equipment drive shaft (6). The tractor (1) is also provided with an electronic control unit (9), a steering rod (10), which steering rod (10) carrying handlebars (11) for manual engagement.

Figure 2:
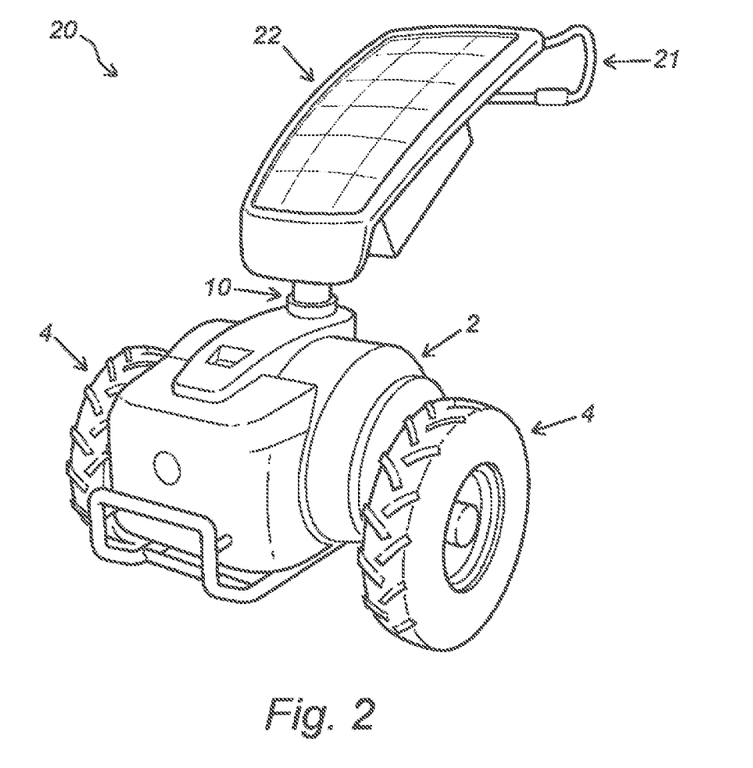
FIG. 2 a perspective view of another embodiment of a tractor according to the invention.

FIG. 2 shows a second embodiment of a single-axle tractor (20) according to the invention comprising a solar panel (22), which solar panel (22) is connected to the steering rod (10). The single-axle tractor (20) as shown in this picture is not coupled to a piece of equipment.

Figure 3:
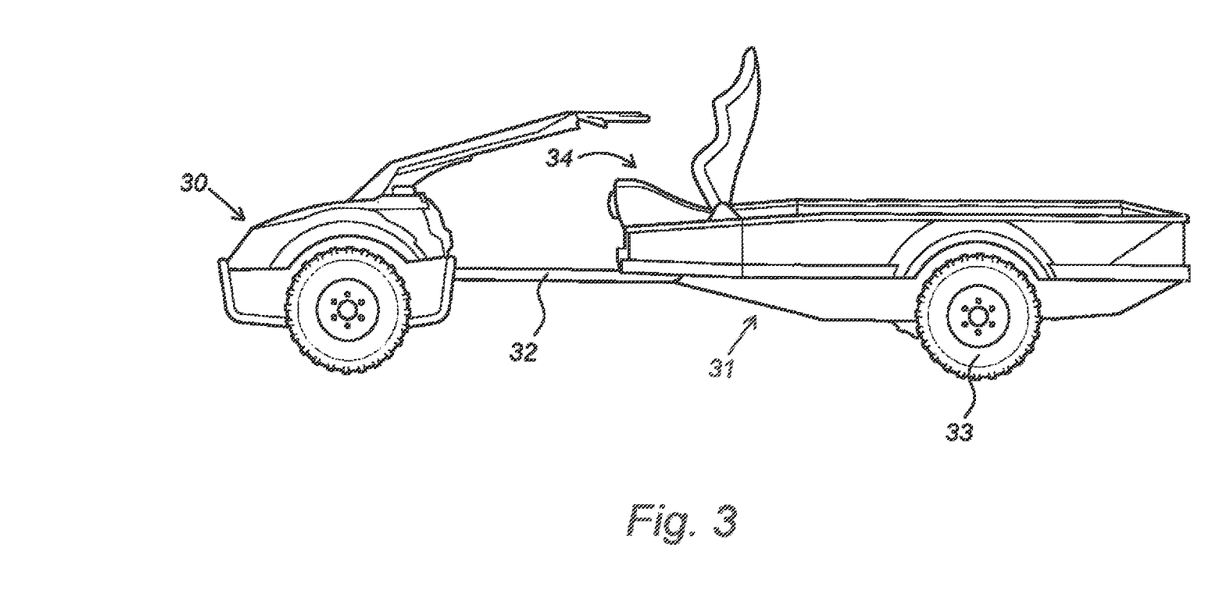
FIG. 3 a perspective view of an assembly of an electrically driven tractor according the invention and a piece of equipment, here an trailer, and FIG. 4 a perspective view on a further embodiment of the electrically driven tractor according to the invention.

FIG. 3 shows a third embodiment of a single-axle tractor (30) according to the invention in line with the tractor (1) a shown in FIG. 1, now coupled to a an trailer (31). The trailer (31) has a drive shaft (32) coupled to the wheels (33) of the trailer (31). The drive shaft (32) of the trailer (31) is coupled to the equipment drive shaft (not visible in this picture) if the tractor (30) thus enabling the tractor (30) to drive the wheels (33) of the trailer (31) as well. The trailer (31) is further provided with a seat (34) for an operator driving the tractor (30)/trailer (31) assembly as depicted.

Figure 4:
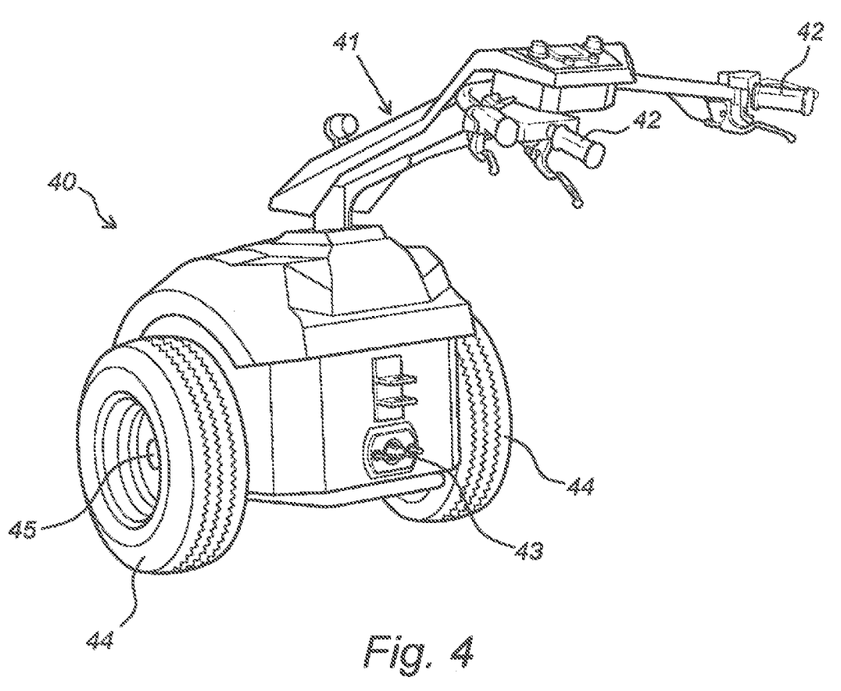

FIG. 4 shows a fourth embodiment of a single-axle tractor (40) according to the invention. The tractor (40) is provided with a steering arm (41), which steering arm (41) carries handlebars (42) for manual engagement. The steering arm (41) may be rotated to either side of the single-axle tractor (40) thus further enhancing the flexibility in use of the single-axle tractor (40). For instance piece of equipment (not shown in this figure) may be coupled to the single-axle tractor (40) on the side of the operator or on the opposite side of the operator just by relocating the position of the steering arm (41). Clearly visible is also that an equipment drive shaft (43) is located in the middle between wheels (44) and oriented perpendicular to a drive axle (45) connecting the wheels (44).

It will be apparent that the invention is not limited to the exemplary embodiments shown and described here, but that within the scope of the appended claims numerous variants are possible which will be self-evident to the skilled person in this field.

The invention claimed is:

1. An electrically driven single-axle tractor for coupling with, and powering a piece of equipment, comprising:
   a tractor frame of the single-axle tractor that supports a pair of wheels;
   a single drive axle, connected to the tractor frame, and connected to the pair of wheels on opposite sides of the single drive axle;
   a primary electric motor coupled to the single drive axle for only connecting to the pair of wheels on the single drive axle;
   an equipment drive shaft for releasable coupling with the piece of equipment; and,
   at least one electrical energy source, as a power supply of the primary electric motor; wherein the tractor is further provided with at least one secondary electric motor, which secondary electric motor is only coupled to the equipment drive shaft, wherein the at least one electrical energy source is also a power supply of the secondary electric motor, wherein the drive axle and the equipment drive shaft are perpendicularly oriented, and wherein the primary electric motor only connects to the pair of wheels on the drive axle and the secondary electric motor only connects to the equipment drive shaft.

2. The tractor according to claim 1, wherein the drive axle and the equipment drive shaft are independently controllable.

3. The tractor according to claim 1, wherein the equipment drive shaft is oriented at a central position of the tractor.

4. The tractor according to claim 1, wherein the electrical energy source is one of a supercapacitor, fuel cell or a battery, and is preferably rechargeable.

5. The tractor according to claim 1, wherein the tractor comprises at least one solar panel.

6. The tractor according to claim 1, wherein the tractor comprises one of a DC/DC converter or a AC/DC converter.

7. The tractor according to claim 1, wherein the tractor comprises at least one brake connected to at least one of the pair of wheels.

8. The tractor according to claim 1, wherein the tractor comprises one of an electronic control unit or an electrical energy source management system.

9. An assembly of the electrically driven tractor according to claim 1 and the piece of equipment selected from a group including ploughs and trailers.

10. A method for driving the electrically driven single-axle tractor according claim 1 wherein the drive axle is powered with the primary electric motor and the equipment drive shaft is driven by the secondary electric motor and the operating of the primary electric motor and the secondary electric motor are independently controlled.

11. The tractor according to claim 2, wherein the equipment drive shaft is oriented at a central position of the tractor.

12. The tractor according to claim 2, wherein the equipment drive shaft is configured to cooperate, with the piece of equipment.

13. The tractor according to claim 2, wherein the electrical energy source is one of a supercapacitor, fuel cell or a battery, and is preferably rechargeable.

14. The tractor according to claim 2, wherein the tractor comprises at least one solar panel.

15. The tractor according to claim 2 wherein the tractor comprises one of a DC/DC converter or a AC/DC converter.

16. The tractor according to claim 2, wherein the tractor comprises at least one brake connected to at least one of the pair of wheels.

17. The tractor according to claim 2, wherein the tractor comprises at least one of an electronic control unit or an electrical energy source management system.

18. An assembly of the electrically driven tractor according to claim 2, and the piece of equipment selected from a group including ploughs and trailers.

19. A method for driving the electrically driven single-axle tractor according claim 2, wherein the drive axle is powered with the primary electric motor and the equipment drive shaft is driven by the secondary electric motor and the operating of the primary electric motor and the secondary electric motor are independently controlled.

20. The tractor according to claim 1, further comprising a steering arm for carrying handlebars for manual engagement by an operator, wherein the steering arm is rotatable to either side of the single-axle tractor thus further enhancing flexibility in use of the single-axle tractor.

21. The tractor according to claim 20, wherein the steering arm is relocateable so that the piece of equipment is alternately coupled to the single-axle tractor on either a side of the operator or on an opposite side from the operator.

\* \* \* \* \*